(12) United States Patent
Prasad et al.

(10) Patent No.: US 11,128,556 B2
(45) Date of Patent: Sep. 21, 2021

(54) DEPLOYING, TESTING, MONITORING, SCALING, AND HEALING VIRTUAL NETWORK FUNCTIONS IN A SOFTWARE-DEFINED NETWORK

(71) Applicant: Accenture Global Solutions Limited, Dublin (IE)

(72) Inventors: Rajendra T. Prasad, Basking Ridge, NJ (US); Aditi Kulkarni, Bangalore (IN); Sunil Rana, Bangalore (IN); Vijeth S. Hedge, Bangalore (IN); Arun Vidyadharan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/280,662

(22) Filed: Feb. 20, 2019

(65) Prior Publication Data
US 2020/0267072 A1 Aug. 20, 2020

(51) Int. Cl.
*H04L 12/26* (2006.01)
*G06F 9/455* (2018.01)
*H04L 12/715* (2013.01)

(52) U.S. Cl.
CPC .......... *H04L 43/50* (2013.01); *G06F 9/45558* (2013.01); *H04L 45/04* (2013.01); *H04L 45/64* (2013.01); *G06F 2009/45595* (2013.01)

(58) Field of Classification Search
CPC ......... H04L 43/50; H04L 45/64; H04L 45/04; H04L 43/0817; G06F 9/45558; G06F 2009/45595
See application file for complete search history.

(56) References Cited

U.S. PATENT DOCUMENTS

| | | | |
|---|---|---|---|
| 9,239,717 B1 * | 1/2016 | AlSaeed | H04L 67/10 |
| 10,379,922 B1 * | 8/2019 | Bell | G06F 11/0793 |
| 2014/0068600 A1 * | 3/2014 | Ashok | G06F 9/5077 |
| | | | 718/1 |

(Continued)

OTHER PUBLICATIONS

European Telecommunications Standards Institute (ETSI)., "Network Functions Virtualisation (NFV) Virtual Network Functions Architecture; Draft ETSI GS NFV-SWA 001", vol. ISG-NFV (V.0.2.1), Oct. 1, 2014, pp. 1-92, XP014230022.

(Continued)

*Primary Examiner* — Ario Etienne
*Assistant Examiner* — Kamal Hossain
(74) *Attorney, Agent, or Firm* — Harrity & Harrity, LLP

(57) ABSTRACT

A device receives virtual network function (VNF) data identifying a VNF to be implemented in a network and configures the VNF data with hardware and software requirements for deploying the VNF in a non-production environment, wherein configuring the VNF data with the hardware and software requirements generates a configured VNF. The device deploys the configured VNF in the non-production environment and performs one or more tests on the configured VNF deployed in the non-production environment. The device receives one or more test results based on performing the one or more tests on the configured VNF, and updates the configured VNF, based on the one or more test results, to generate an updated VNF. The device causes the updated VNF to be deployed in the network.

20 Claims, 16 Drawing Sheets

(56) References Cited

U.S. PATENT DOCUMENTS

| | | | | |
|---|---|---|---|---|
| 2014/0189677 A1* | 7/2014 | Curzi | ........................ | G06F 8/65 |
| | | | | 717/171 |
| 2015/0234725 A1* | 8/2015 | Cillis | .................... | G06F 11/263 |
| | | | | 714/33 |
| 2015/0358248 A1* | 12/2015 | Saha | ........................ | H04L 47/70 |
| | | | | 709/226 |
| 2016/0103698 A1* | 4/2016 | Yang | ..................... | G06F 11/203 |
| | | | | 714/4.11 |
| 2016/0299772 A1* | 10/2016 | Seenappa | ................. | G06F 11/16 |
| 2017/0187572 A1* | 6/2017 | Wu | ........................ | H04L 41/145 |
| 2017/0272523 A1 | 9/2017 | Cillis et al. | | |
| 2018/0121335 A1* | 5/2018 | Cillis | ................... | G06F 11/3684 |
| 2018/0316559 A1* | 11/2018 | Thulasi | ............... | H04L 41/5041 |
| 2019/0028350 A1* | 1/2019 | Yeung | ................... | H04L 9/0894 |
| 2019/0104047 A1* | 4/2019 | Tejaprakash | ............ | H04L 43/50 |
| 2019/0129712 A1* | 5/2019 | Hawrylo | ................... | G06F 8/71 |
| 2019/0179731 A1* | 6/2019 | V | ........................ | G06F 11/3688 |
| 2019/0222638 A1* | 7/2019 | Keller | .................... | H04L 47/122 |
| 2019/0342187 A1* | 11/2019 | Zavesky | ............. | H04L 41/5009 |
| 2019/0394658 A1* | 12/2019 | Baillargeon | ............ | H04L 67/10 |

OTHER PUBLICATIONS

European Telecommunications Standards Institute (ETSI)., "Network Functions Virtualisation (NFV) Testing; Report on NFV CICD and Devops", NFV-TST 006, No. (V0.0.10), Jan. 21, 2019, pp. 149, XP014334335, Retrieved from [URL: http://docbox.etsi.org/ISG/NFV/Open/Drafts/TST006_CICD_and_Devops_report/NFV-TST006v0010.docx].
Extended European Search Report for Application No. EP20157806.9, dated Jul. 20, 2020, 12 pages.

* cited by examiner

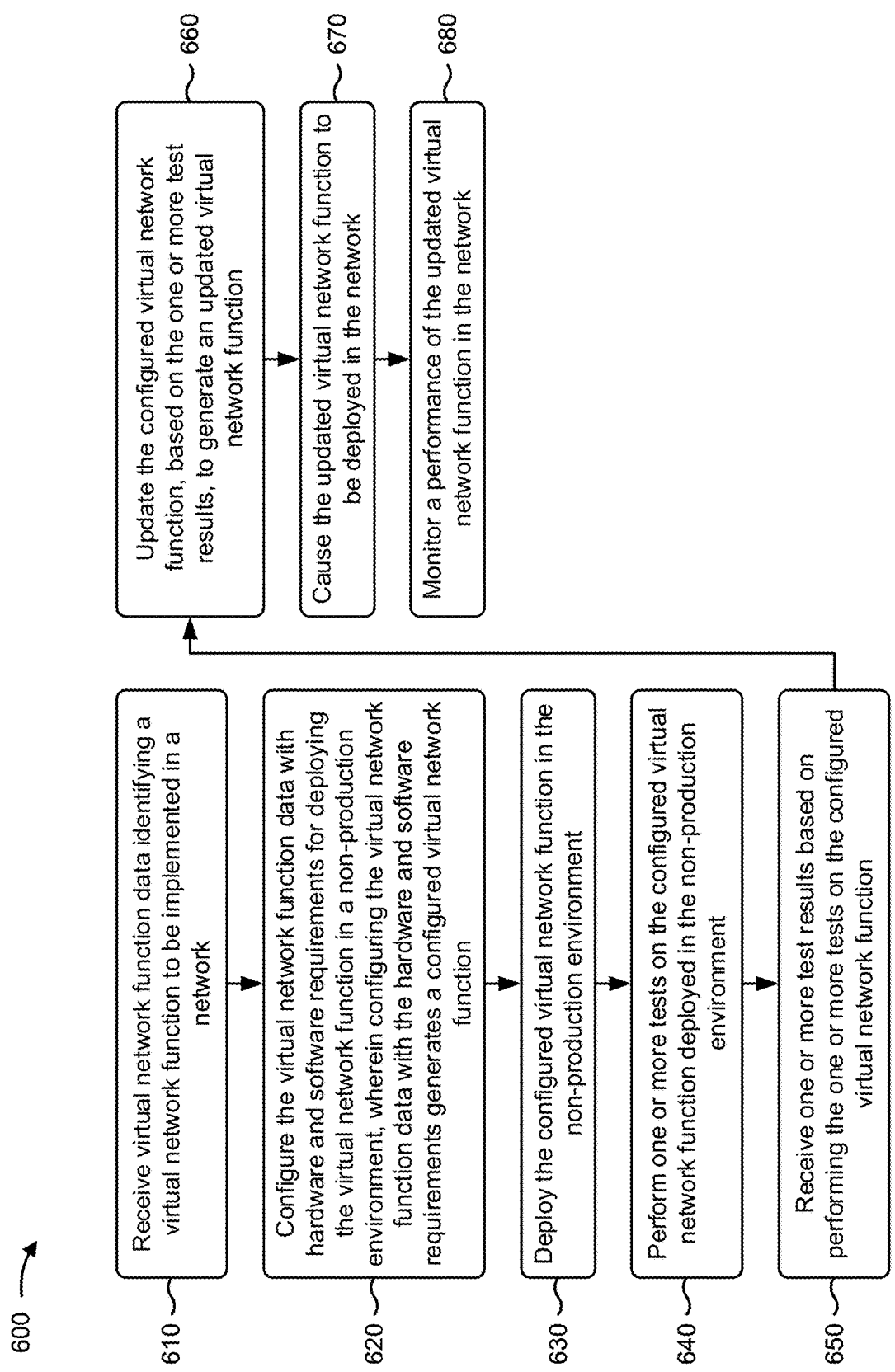

DEPLOYING, TESTING, MONITORING, SCALING, AND HEALING VIRTUAL NETWORK FUNCTIONS IN A SOFTWARE-DEFINED NETWORK

BACKGROUND

Software-defined networks have been making considerable progress in allowing networking layers to be more flexible in the form of software that is agile, programmable, and vendor-agnostic, and that provides a centralized overview of an entire network topology. This enables a network operator to move from proprietary hardware devices to more robust software-defined networking devices.

SUMMARY

According to some implementations, a method may include receiving virtual network function data identifying a virtual network function to be implemented in a network, and configuring the virtual network function data with hardware and software requirements for deploying the virtual network function in a non-production environment, wherein configuring the virtual network function data with the hardware and software requirements may generate a configured virtual network function. The method may include deploying the configured virtual network function in the non-production environment, and performing one or more tests on the configured virtual network function deployed in the non-production environment. The method may include receiving one or more test results based on performing the one or more tests on the configured virtual network function, and updating the configured virtual network function, based on the one or more test results, to generate an updated virtual network function. The method may include causing the updated virtual network function to be deployed in the network, and monitoring a performance of the updated virtual network function in the network. The method may include removing the updated virtual network function from the network based on the performance of the updated virtual network function, and replacing the removed updated virtual network function with a new virtual network function in the network, wherein data associated with the new virtual network function may be configured with the hardware and software requirements.

According to some implementations, a device may include one or more memories, and one or more processors, communicatively coupled to the one or more memories, to receive virtual network function data identifying a virtual network function to be implemented in a network, and configure the virtual network function data with hardware and software requirements for deploying the virtual network function in a non-production environment, wherein configuring the virtual network function data with the hardware and software requirements may generate a configured virtual network function. The one or more processors may deploy the configured virtual network function in the non-production environment, and may perform one or more tests on the configured virtual network function deployed in the non-production environment. The one or more processors may receive one or more test results based on performing the one or more tests on the configured virtual network function, and may update the configured virtual network function, based on the one or more test results, to generate an updated virtual network function. The one or more processors may cause the updated virtual network function to be deployed in the network.

According to some implementations, a non-transitory computer-readable medium may store instructions that include one or more instructions that, when executed by one or more processors of a device, cause the one or more processors to receive virtual network function data identifying a virtual network function to be implemented in a network. The one or more instructions may cause the one or more processors to configure the virtual network function data with hardware and software requirements for deploying the virtual network function in a non-production environment, wherein configuring the virtual network function data with the hardware and software requirements may generate a configured virtual network function. The one or more instructions may cause the one or more processors to deploy the configured virtual network function in the non-production environment, and perform one or more tests on the configured virtual network function deployed in the non-production environment. The one or more instructions may cause the one or more processors to receive one or more test results based on performing the one or more tests on the configured virtual network function, and update the configured virtual network function, based on the one or more test results, to generate an updated virtual network function. The one or more instructions may cause the one or more processors to cause the updated virtual network function to be deployed in the network, and monitor a performance of the updated virtual network function in the network.

BRIEF DESCRIPTION OF THE DRAWINGS

FIGS. 4-6 are flow charts of example processes for deploying, testing, monitoring, scaling, and healing virtual network functions in a software-defined network.

DETAILED DESCRIPTION

Figure 1A:
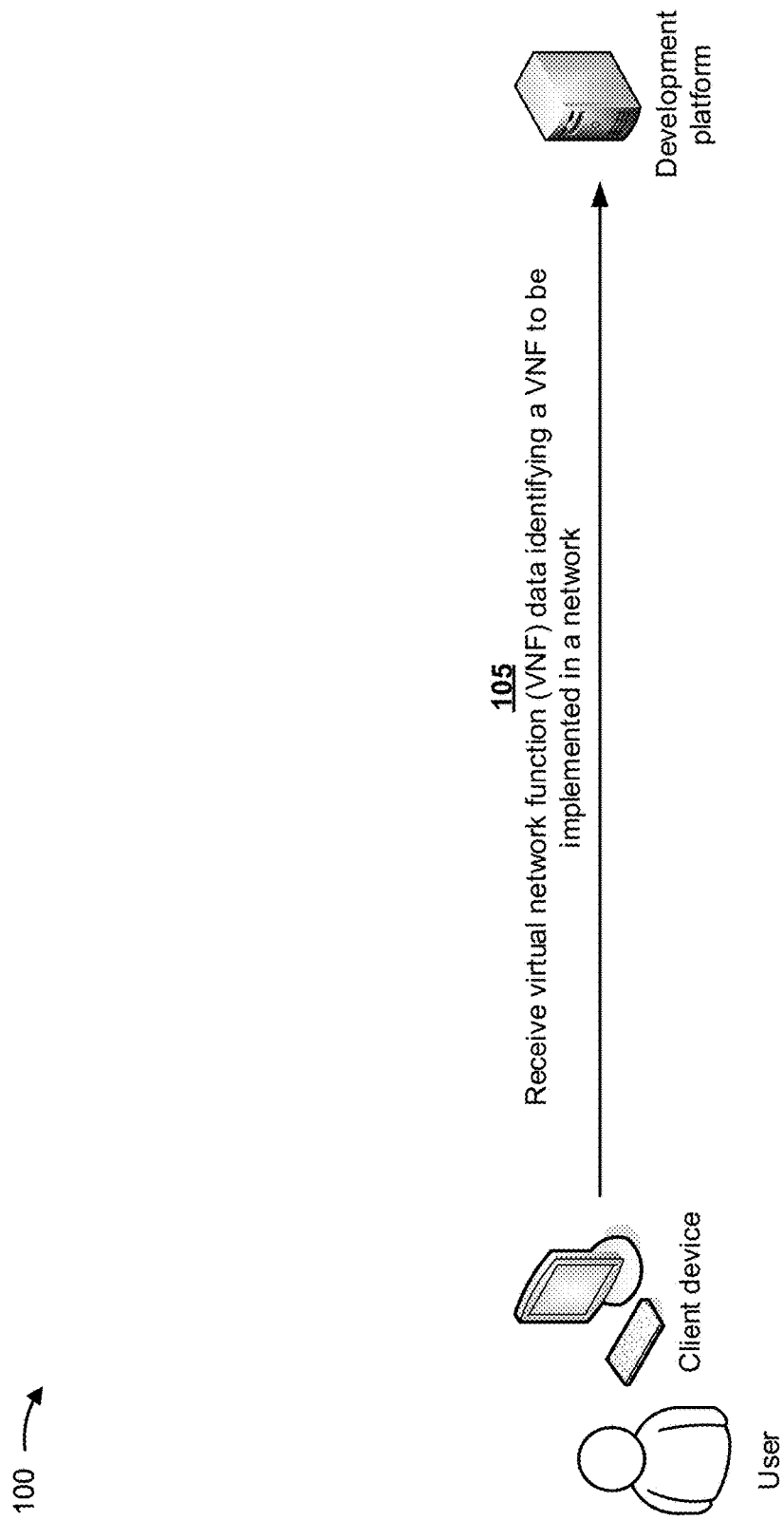
FIGS. 1A-1K are diagrams of an example implementation described herein.

The following detailed description of example implementations refers to the accompanying drawings. The same reference numbers in different drawings may identify the same or similar elements.

Creating and managing a large software-defined network (e.g., a fifth-generation (5G) telecommunications software-defined network) requires a variety of operators to plan, create, and manage hundreds, thousands, ten of thousands, and/or the like of virtual network functions (e.g., virtual base stations, virtual network slice selection functions (NSSFs), virtual network exposure functions (NEFs), virtual authentication server functions (AUSFs), virtual unified data management (UDM) components, virtual policy control functions (PCFs), virtual application functions (AFs), virtual access and mobility management functions (AMFs), virtual session management functions (SMFs), virtual user plane functions (UPFs), and/or the like). However, such operators may work individually, which may cause redundant virtual network functions, inoperable virtual network functions, conflicting virtual network functions, and/or the like. This causes computing resources (e.g., processing resources, memory resources, and/or the like), networking resources, and/or the like, to be wasted identifying the redundant, inoperable, and/or conflicting virtual network functions, correcting the redundant, inoperable, and/or conflicting virtual network functions, managing the software-defined network, and/or the like.

Some implementations described herein provide a development platform that deploys, tests, monitors, scales, and heals virtual network functions in a software-defined network. For example, the development platform may receive virtual network function data identifying a virtual network function to be implemented in a network, and may configure the virtual network function data with hardware and software requirements for deploying the virtual network function in a non-production environment, wherein configuring the virtual network function data with the hardware and software requirements may generate a configured virtual network function. The development platform may deploy the configured virtual network function in the non-production environment, and may perform one or more tests on the configured virtual network function deployed in the non-production environment. The development platform may receive one or more test results based on performing the one or more tests on the configured virtual network function, and may update the configured virtual network function, based on the one or more test results, to generate an updated virtual network function. The development platform may cause the updated virtual network function to be deployed in the network.

In this way, the development platform reduces redundant virtual network functions, inoperable virtual network functions, conflicting virtual network functions, and/or the like, and conserves computing resources, networking resources, and/or the like that would otherwise be wasted identifying the redundant, inoperable, and/or conflicting virtual network functions, correcting the redundant, inoperable, and/or conflicting virtual network functions, managing the software-defined network, and/or the like.

FIGS. 1A-1K are diagrams of an example implementation 100 described herein. As shown in FIG. 1A, a user may be associated with a client device and a development platform. The user may utilize the client device to generate virtual network function (VNF) data that identifies a VNF to be implemented in a production environment, such as a software-defined network. In some implementations, the software-defined network may include a telecommunications software-defined network, such as a third generation (3G) software-defined network, a fourth generation (4G) or long-term evolution (LTE) software-defined network, a fifth generation (5G) software-defined network, and/or the like. In some implementations, when the software-defined network is a 5G software-defined network, the VNF may include a virtual base station, a virtual NSSF, a virtual NEF, a virtual AUSF, a virtual UDM component, a virtual PCF, a virtual AF, a virtual AMF, a virtual SMF, a virtual UPF, and/or the like.

As further shown in FIG. 1A, and by reference number 105, the development platform may receive, from the client device, the VNF data identifying the VNF to be implemented in the network. In some implementations, the development platform may store the VNF data in a data structure (e.g., a database, a table, a list, and/or the like) associated with the development platform.

Figure 1B:
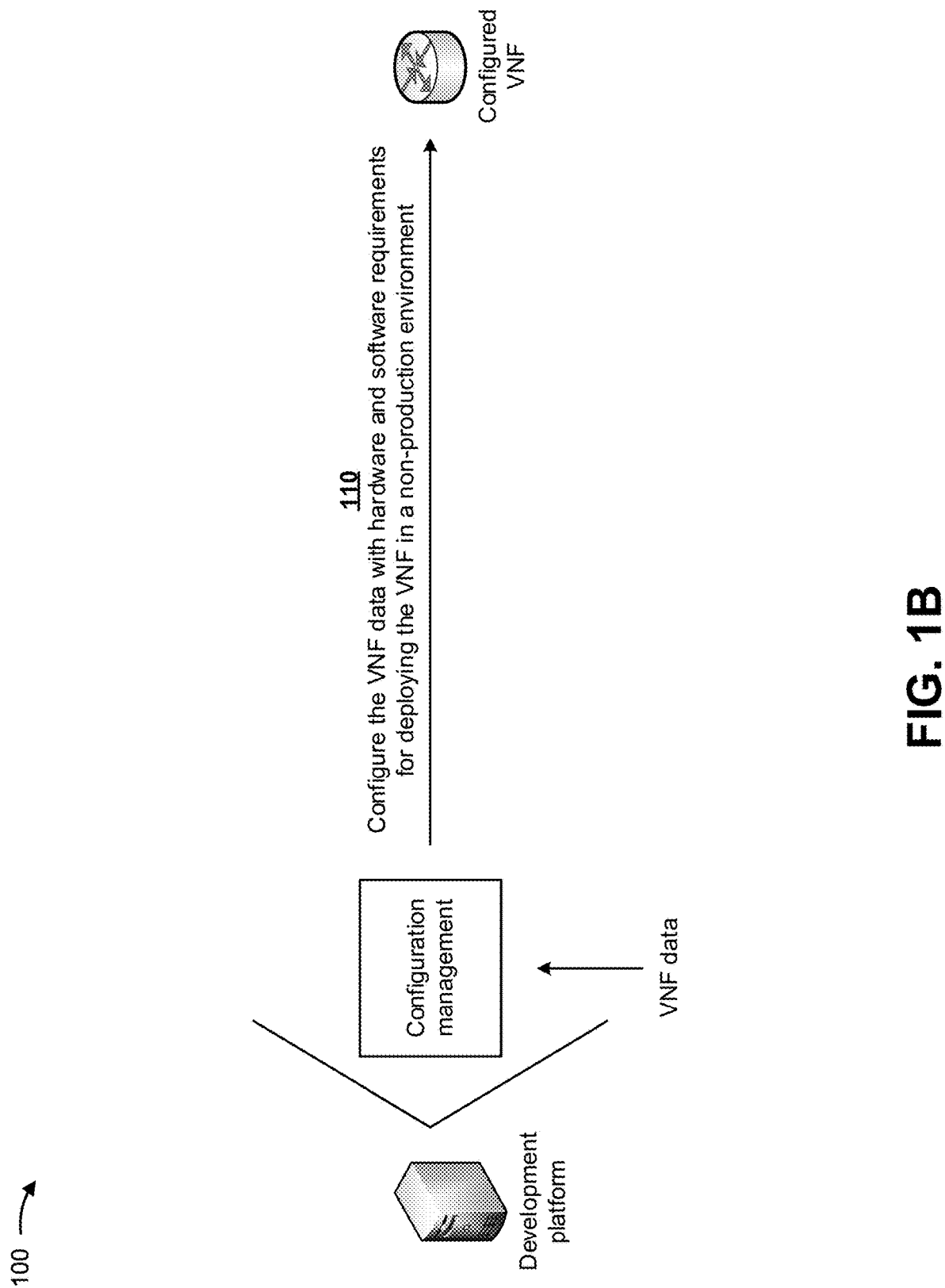

As shown in FIG. 1B, and by reference number 110, the development platform may configure the VNF data (e.g., a VNF image) with hardware and software requirements for deploying the VNF in a non-production environment. In some implementations, the hardware and software requirements may include information indicating hardware requirements for performing hardware functions by the VNF (e.g., hardware requirements necessary for a virtual NSSF to perform hardware functions of a real NSSF), software requirements for performing software functions by the VNF (e.g., software requirements necessary for virtual AUSF to perform software functions of a real AUSF), and/or the like. In some implementations, the non-production environment may include a testing environment that simulates a production environment (e.g., a software-defined network) for testing the VNF. In some implementations, configuring the VNF data with the hardware and software requirements may generate a configured VNF that may be deployed in the non-production environment. In some implementations, the development platform may configure the VNF data with the hardware and software requirements to enable the VNF to be launched in virtual machines (VMs) of the non-production environment.

Figure 1C:
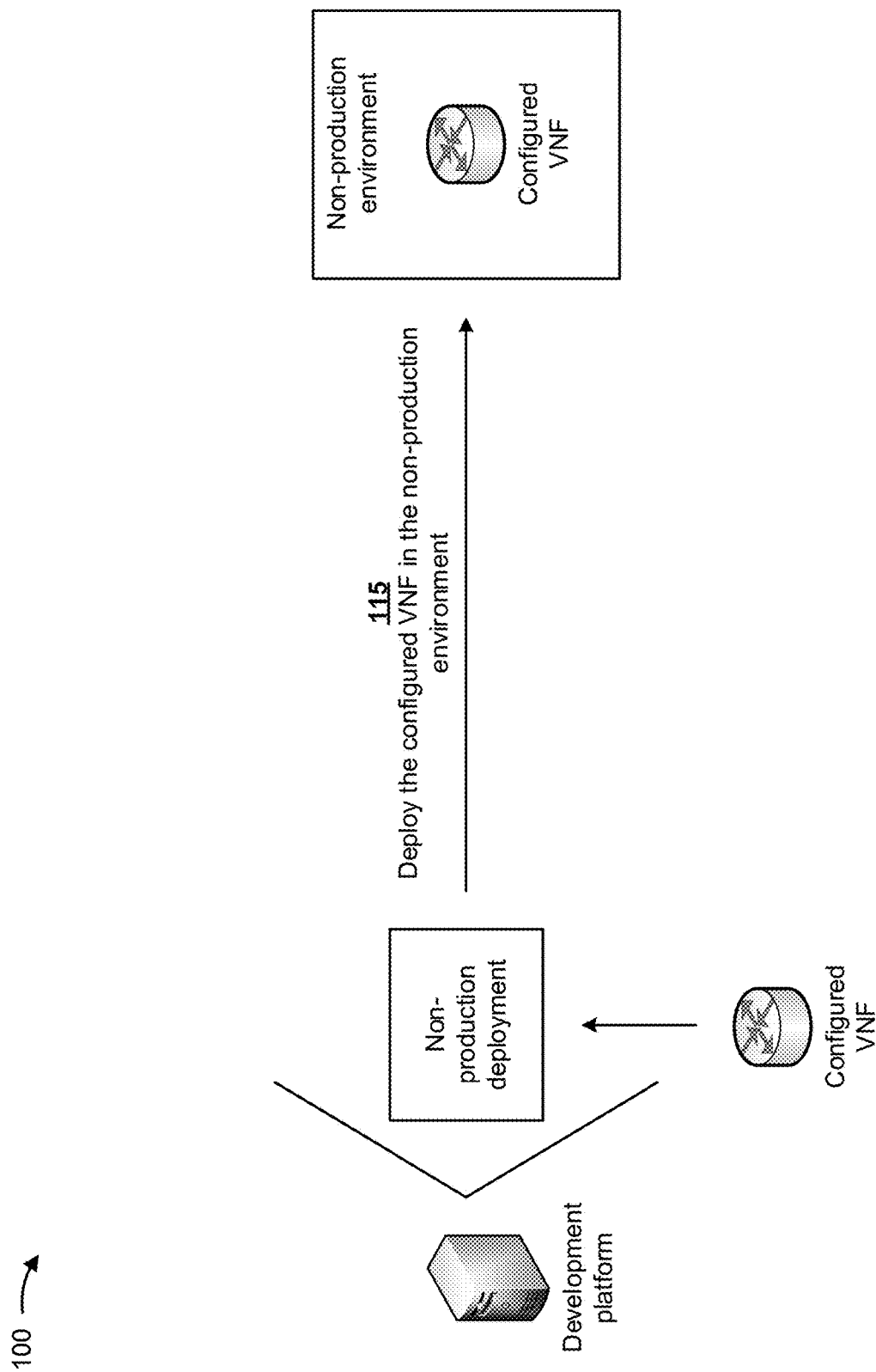

As shown in FIG. 1C, and by reference number 115, the development platform may deploy the configured VNF in the non-production environment. In some implementations, the development platform may cause the configured VNF to be instantiated in the non-production environment in such a manner that the configured VNF may perform functions that the configured VNF would perform in the production environment (e.g., the software-defined network). For example, if the configured VNF is a virtual base station, the development platform may cause the configured VNF to be situated in the non-production environment so that the configured VNF performs functions of a virtual base station.

Figure 1D:
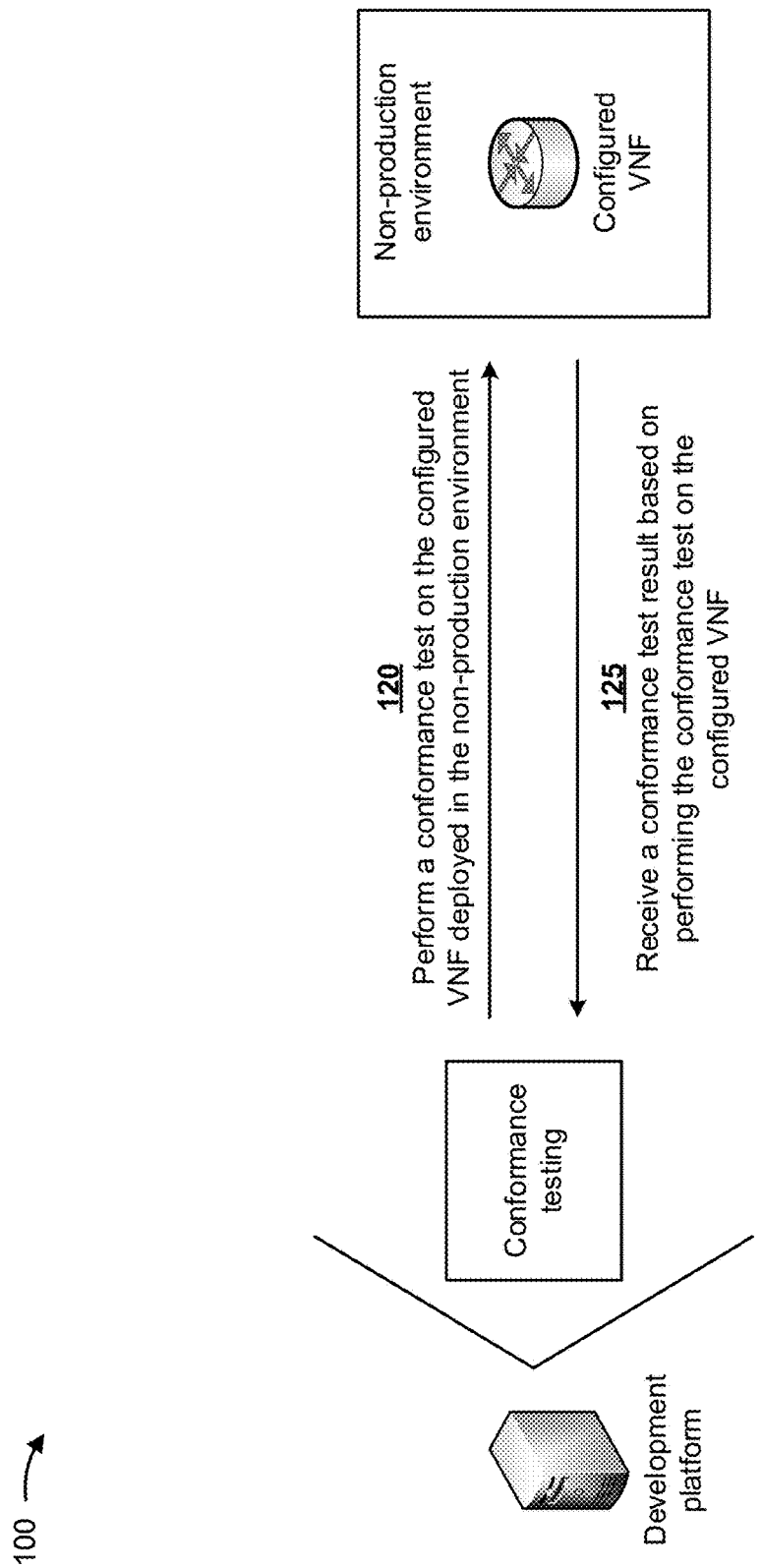

As shown in FIG. 1D, and by reference number 120, the development platform may perform a conformance test on the configured VNF deployed in the non-production environment. In some implementations, the conformance test may include a test to determine whether the configured VNF conforms to verification requirements (e.g., compliance standards) established for functions to be performed by the configured VNF. For example, if the configured VNF is to perform functions of a virtual NEF, the conformance test may include a test to determine whether the configured VNF conforms to verification requirements established for a virtual NEF.

As further shown in FIG. 1D, and by reference number 125, the development platform may receive a conformance test result based on performing the conformance test on the configured VNF. In some implementations, the conformance test result may include a test result indicating whether the configured VNF conforms to the verification requirements established for functions to be performed by the configured VNF. If the conformance test result indicates that the configured VNF conforms to the verification requirements, the configured VNF may pass the conformance test. If the conformance test result indicates that the configured VNF does not conform to the verification requirements, the configured VNF may fail the conformance test.

Figure 1E:
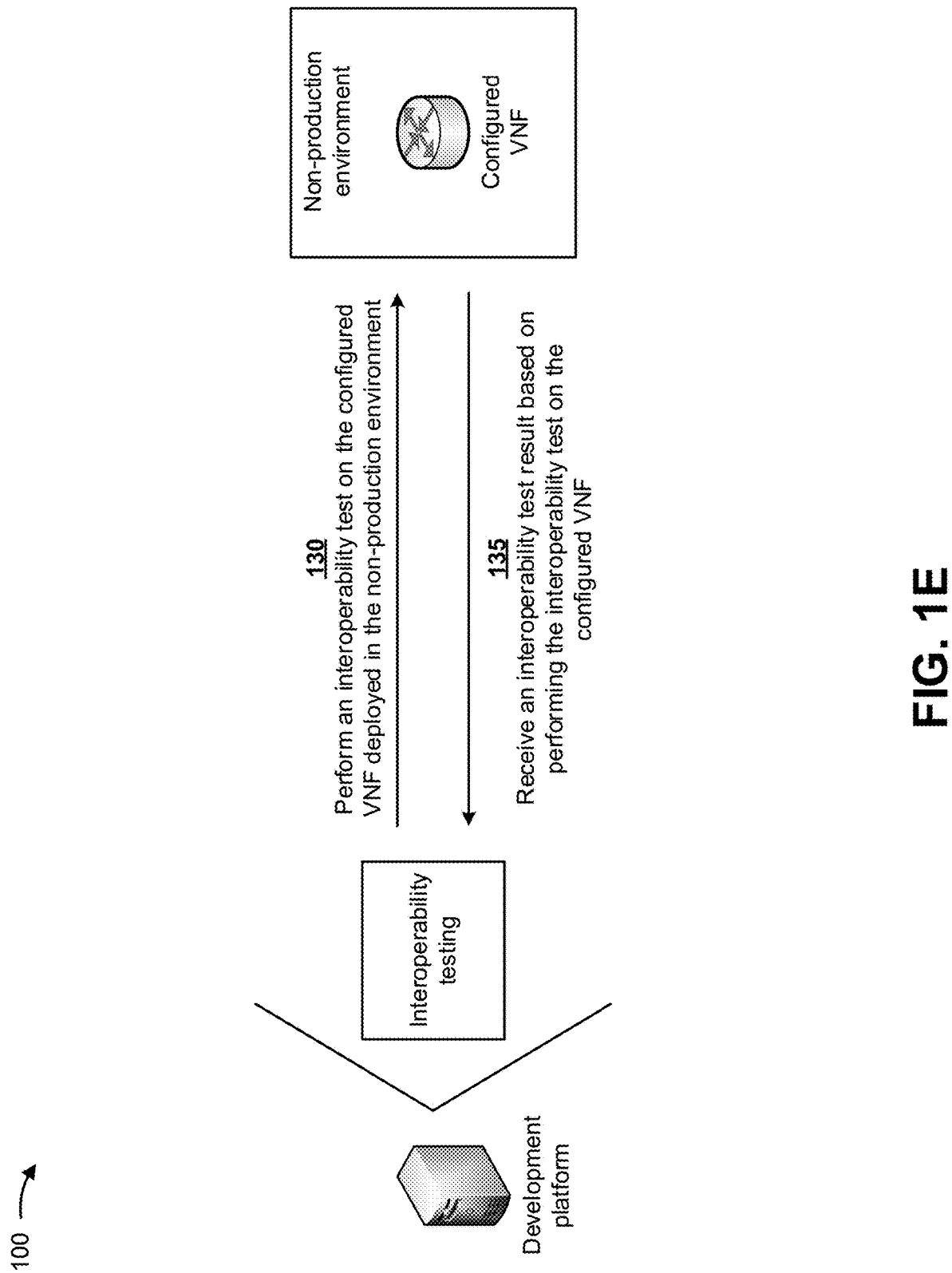

As shown in FIG. 1E, and by reference number 130, the development platform may perform an interoperability test on the configured VNF deployed in the non-production environment. In some implementations, the interoperability test may include a test of operation and functioning of the configured VNF when the configured VNF is integrated with other VNFs in the non-production environment. For example, the other VNFs may provide traffic to the configured VNF to determine whether the configured VNF processes the traffic appropriately.

As further shown in FIG. 1E, and by reference number 135, the development platform may receive an interoperability test result based on performing the interoperability test on the configured VNF. In some implementations, the interoperability test result may include a test result indicating whether the configured VNF operates and functions properly when the configured VNF is integrated with the other VNFs in the non-production environment. If the interoperability test result indicates that the configured VNF operates and functions properly, the configured VNF may pass the interoperability test. If the interoperability test result indicates that the configured VNF operates or functions improperly, the configured VNF may fail the interoperability test.

Figure 1F:
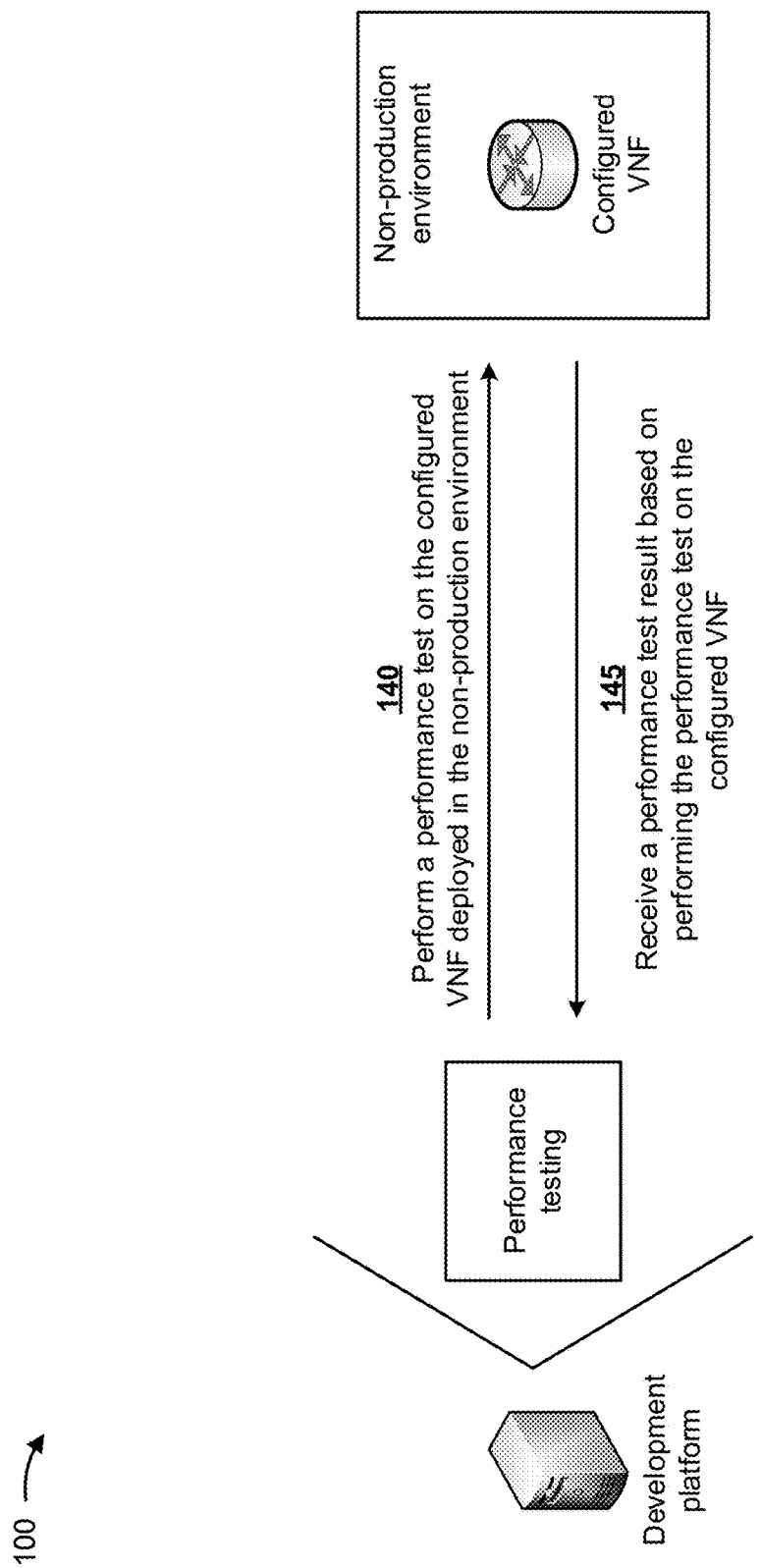

As shown in FIG. 1F, and by reference number 140, the development platform may perform a performance test on the configured VNF deployed in the non-production environment. In some implementations, the performance test may include a test of a capability of the configured VNF, a test to determine whether the configured VNF satisfies a threshold performance level (e.g., a threshold bandwidth, a threshold traffic load, etc.), and/or the like. For example, the development platform may provide a threshold traffic load to the configured VNF to determine whether the configured can handle the threshold traffic load.

As further shown in FIG. 1F, and by reference number 145, the development platform may receive a performance test result based on performing the performance test on the configured VNF. In some implementations, the performance test result may include a test result indicating whether the configured VNF satisfies the threshold performance level. If the performance test result indicates that the configured VNF satisfies the threshold performance level, the configured VNF may pass the performance test. If the performance test result indicates that the configured VNF fails to satisfy the threshold performance level, the configured VNF may fail the performance test.

In some implementations, the development platform may perform one or more of the conformance test, the interoperability test, and/or the performance test on the configured VNF. In some implementations, if the configured VNF fails one or more of the conformance test, the interoperability test, and/or the performance test, the development platform may update the configured VNF based on the test results, as described below in connection with FIG. 1G. In some implementations, the development platform may perform one or more other tests on the configured VNF, such as a unit test, a stress test, a deployment test, and/or the like.

Figure 1G:
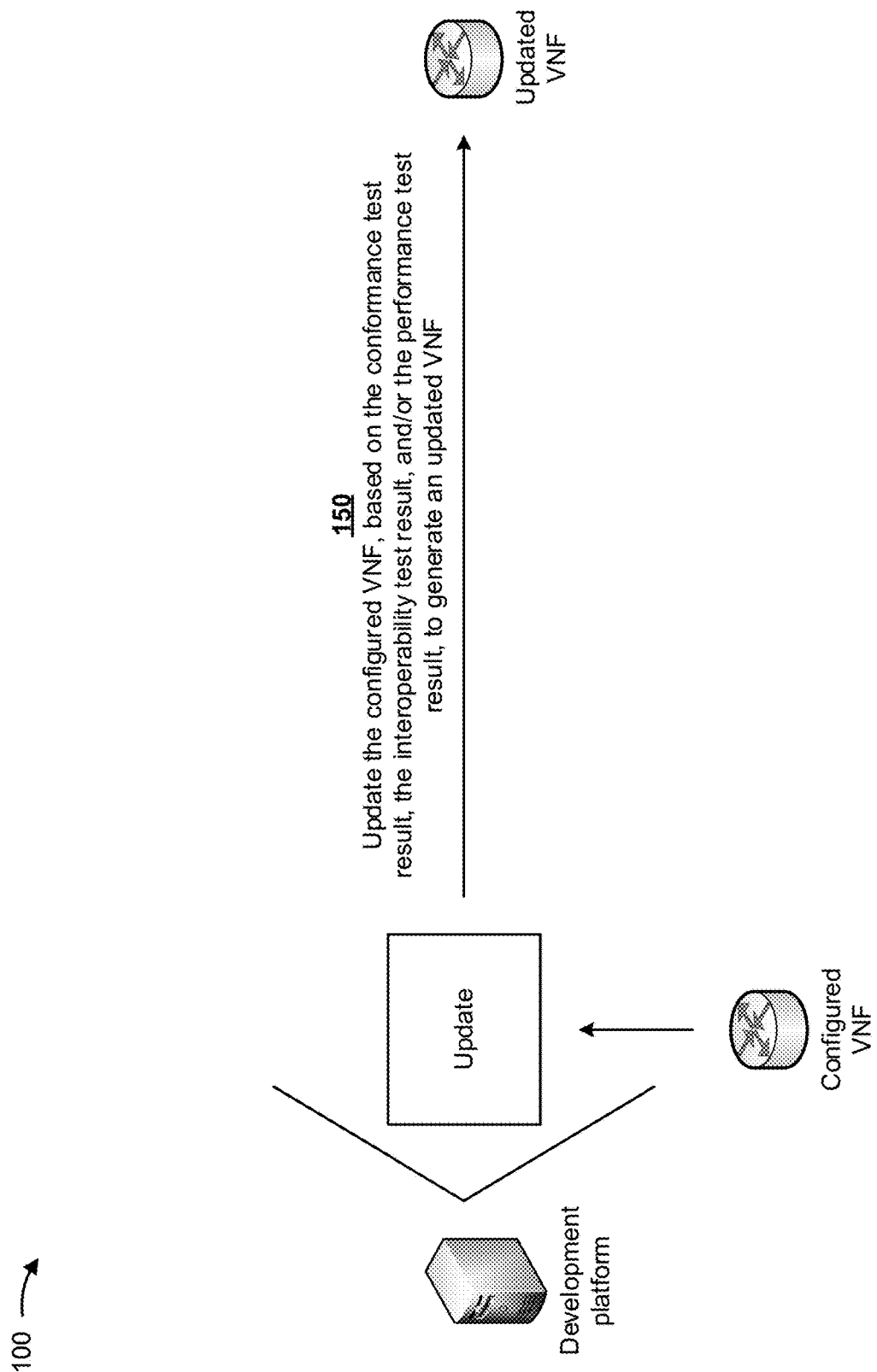

As shown in FIG. 1G, and by reference number 150, the development platform may update the configured VNF, based on the conformance test result, the interoperability test result, and/or the performance test result, to generate an updated VNF. In some implementations, if the configured VNF passes the conformance test, the interoperability test, and the performance test, the development platform may not update the configured VNF to generate the updated VNF. In some implementations, the development platform may update the configured VNF by correcting one or more issues indicated by the conformance test result, the interoperability test result, and/or the performance test result. In some implementations, the development platform may update the configured VNF by upgrading the configured VNF with a functionality or a feature (e.g., indicated as missing by the conformance test result, the interoperability test result, and/or the performance test result).

Figure 1H:
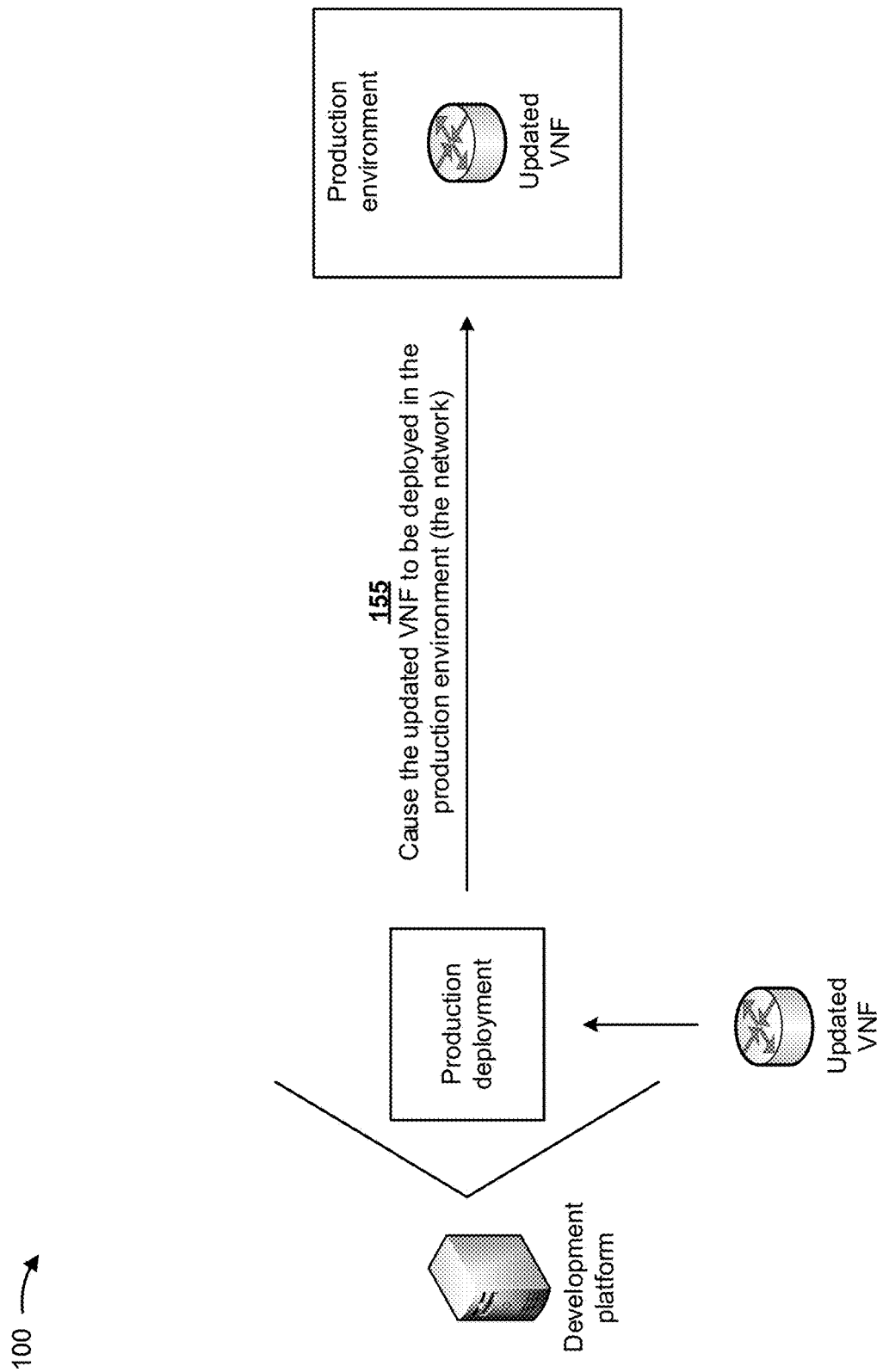

As shown in FIG. 1H, and by reference number 155, the development platform may cause the updated VNF to be deployed in the production environment (e.g., the software-defined network). In some implementations, the development platform may deploy the updated VNF in the production environment, may cause another device to deploy the updated VNF in the production environment, and/or the like. In some implementations, the development platform may cause the updated VNF to be instantiated in the production environment in such a manner that the updated VNF may perform functions in the production environment defined for the updated VNF. For example, if the updated VNF is a virtual base station, the development platform may cause the updated VNF to be situated in the production environment so that the updated VNF performs functions of a virtual base station. In some implementations, the development platform may test the updated VNF deployed in the production environment (e.g., via a conformance test, an interoperability test, a performance test, and/or the like).

Figure 1I:
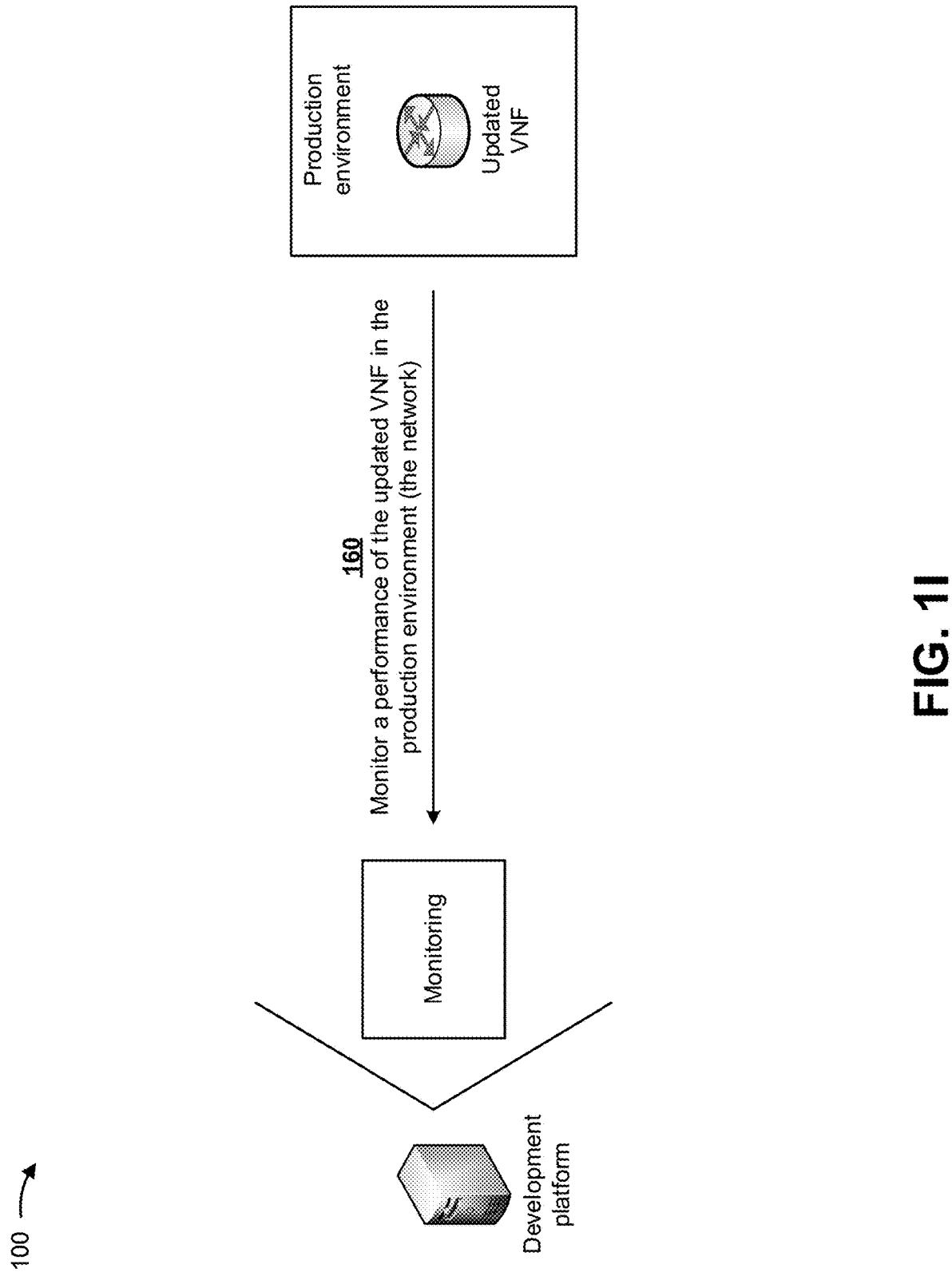

As shown in FIG. 1I, and by reference number 160, the development platform may monitor a performance of the updated VNF in the production environment. In some implementations, the development platform may monitor a performance (e.g., a health status) of the updated VNF based on specifications described in a descriptor associated with the updated VNF. In some implementations, the performance of updated VNF may be periodically reported by the updated VNF to the development platform, continuously reported by the updated VNF to the development platform, and/or the like.

Figure 1J:
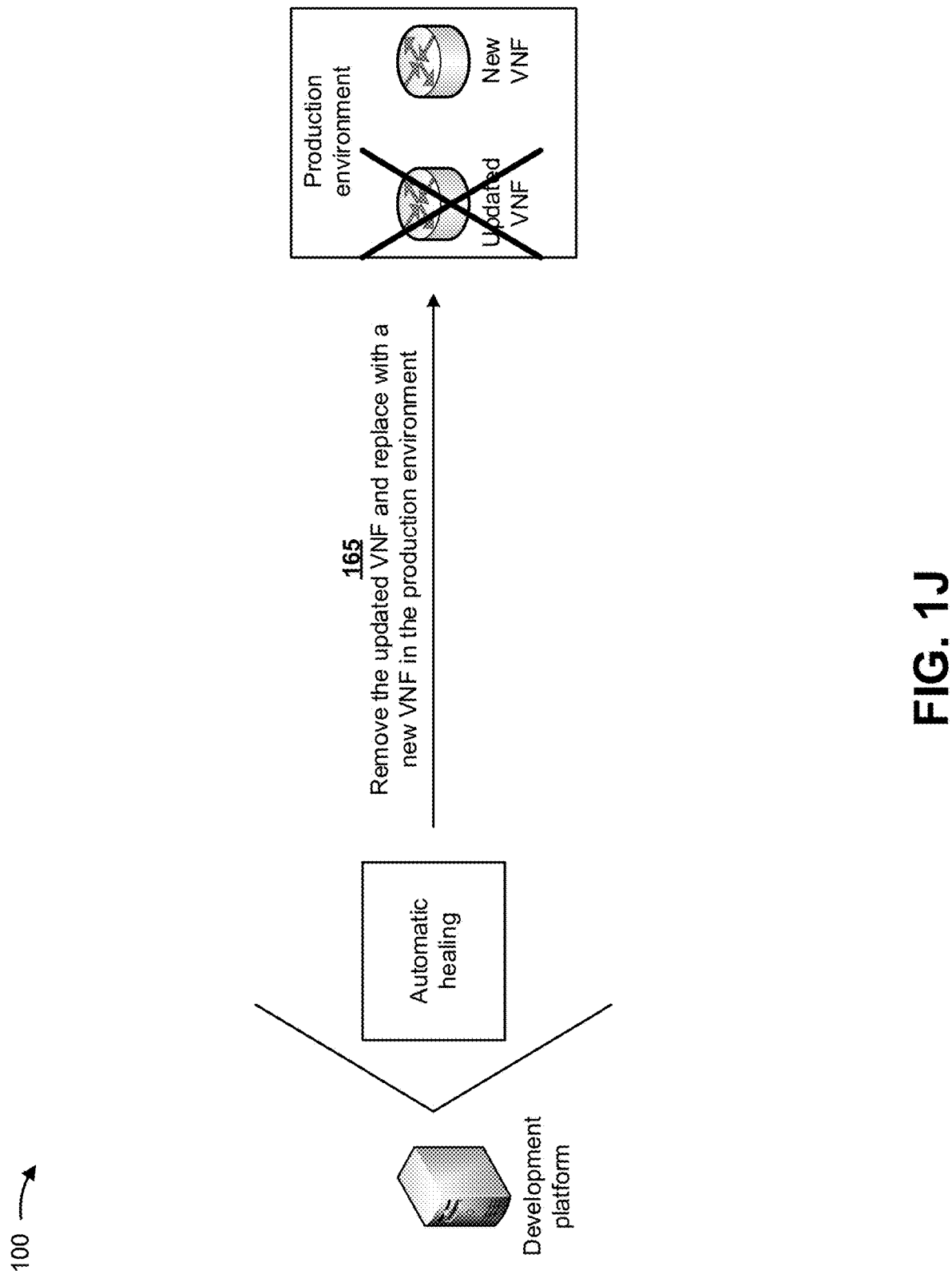

As shown in FIG. 1J, and by reference number 165, the development platform may remove the updated VNF from the production environment and may replace the updated VNF with a new VNF in the production environment. In some implementations, data associated with the new VNF may be configured with the hardware and software requirements, as described above in connection with FIG. 1B. In some implementations, if the monitoring of the updated VNF indicates that the updated VNF is performing abnormally (e.g., is unhealthy), the development platform may remove the updated VNF from the production environment and instantiate the new VNF in the production environment to ensure that functions provided by the updated VNF are not affected or interrupted.

Figure 1K:
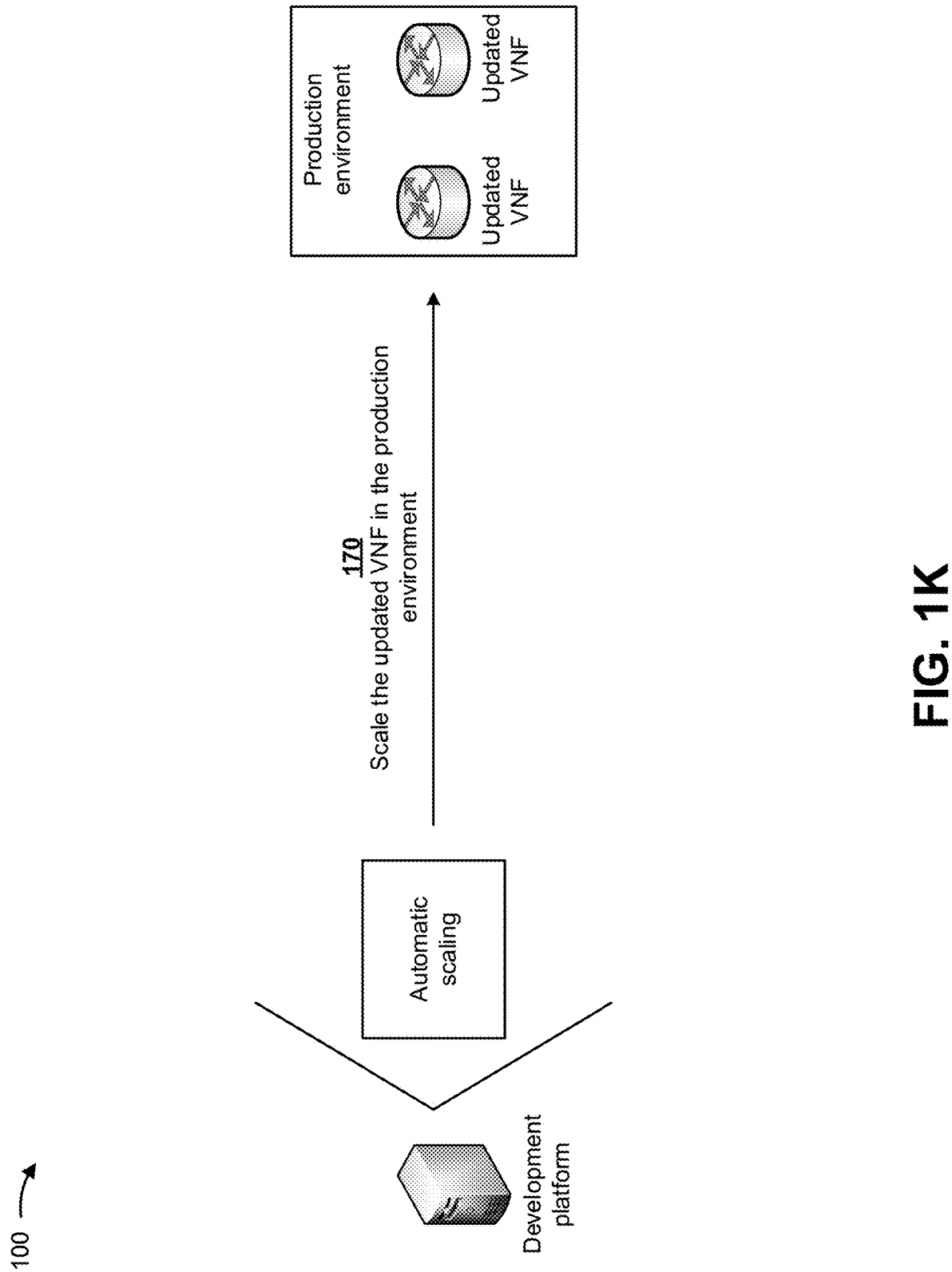

As shown in FIG. 1K, and by reference number 170, the development platform may automatically scale the updated VNF (e.g., to provide additional updated VNFs) in the production environment. In this way, the development platform may automatically scale VNFs in the production environment on demand to ensure continued high availability of functions performed by the VNFs. In some implementations, the development platform may automatically scale the updated VNF with a minimum quantity or a maximum quantity of VNFs depending on usage of the updated VNF. In some implementations, the development platform may cause one or more additional VNFs to be deployed in the network to satisfy a network demand associated with the production environment. In such implementations, data associated with the one or more additional VNFs may be configured with the hardware and software requirements described above in connection with FIG. 1B.

In some implementations, the development platform may update and/or upgrade a VNF with one or more functionalities and/or features and may redeploy the updated/upgraded VNF in the production environment.

In one example, the development platform may configure VNF to be deployed as a virtual router in a network and may create a VNF descriptor for the virtual router. The development platform may deploy the virtual router in the non-production environment and may utilize testing tools to validate the virtual router and functionality of the virtual router based on a pre-validation test of the virtual router and a conformance test of the virtual router in the non-production environment. Any failure in testing of the virtual router may require re-work of the virtual router, redeployment of the virtual router in the non-production environment, and retesting of the virtual router.

Upon successful testing of the virtual router, the development platform may deploy the virtual router in the non-production environment and may perform validation and performance testing on the virtual router VNF. The performance testing may be performed by development platform to predict and study behavior of the virtual router under load conditions before deploying the virtual router in the production environment.

After successful validation and performance testing of the virtual router, the development platform may deploy the virtual router in the production environment. The development platform may monitor the virtual router in the production environment to ensure that the virtual router is operating properly. If the monitoring indicates that the virtual router is malfunctioning, the development platform may terminate the malfunctioning virtual router and may instantiate a new virtual router to ensure maintenance of virtual router functions in the production environment.

In this way, several different stages of the process for deploying, testing, monitoring, scaling, and healing virtual network functions in a software-defined network are automated, which may remove human subjectivity and waste from the process, and which may improve speed and efficiency of the process and conserve computing resources (e.g., processing resources, memory resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that automatically deploys, tests, monitors, scales, and heals virtual network functions in a software-defined network. Finally, automating the process for deploying, testing, monitoring, scaling, and healing virtual network functions in a software-defined network conserves computing resources (e.g., processing resources, memory resources, and/or the like), networking resources, and/or the like that would otherwise be wasted in attempting to create a software-defined network.

As indicated above, FIGS. 1A-1K are provided merely as examples. Other examples may differ from what is described with regard to FIGS. 1A-1K.

Figure 2:
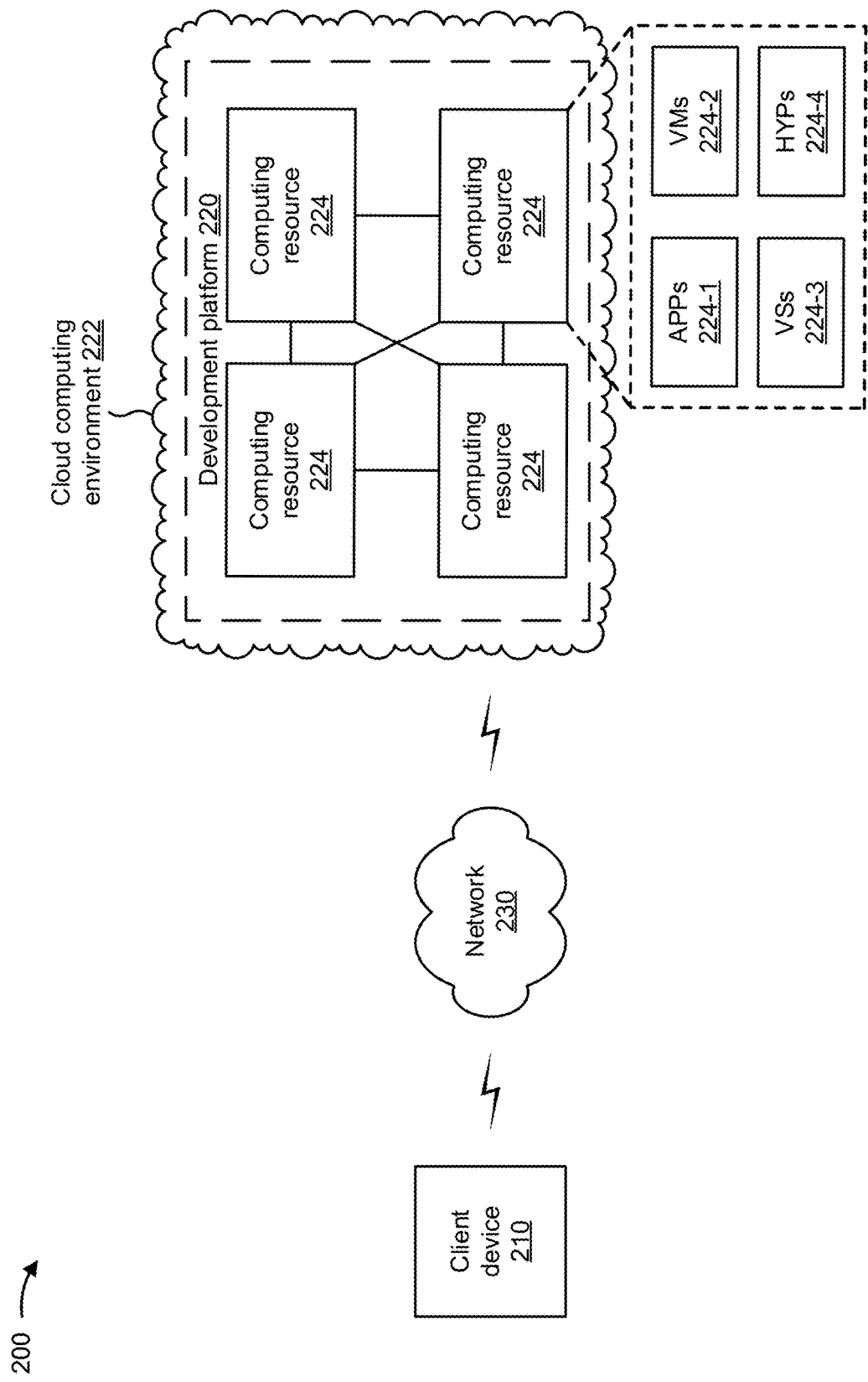
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a development platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to development platform 220.

Development platform 220 includes one or more devices that deploy, test, monitor, scale, and heal virtual network functions in a software-defined network. In some implementations, development platform 220 may be designed to be modular such that certain software components may be swapped in or out depending on a particular need. As such, development platform 220 may be easily and/or quickly reconfigured for different uses. In some implementations, development platform 220 may receive information from and/or transmit information to one or more client devices 210.

In some implementations, as shown, development platform 220 may be hosted in a cloud computing environment 222. Notably, while implementations described herein describe development platform 220 as being hosted in cloud computing environment 222, in some implementations, development platform 220 may not be cloud-based (i.e., may be implemented outside of a cloud computing environment) or may be partially cloud-based.

Cloud computing environment 222 includes an environment that hosts development platform 220. Cloud computing environment 222 may provide computation, software, data access, storage, etc., services that do not require end-user knowledge of a physical location and configuration of system(s) and/or device(s) that hosts development platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host development platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with development platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of development platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
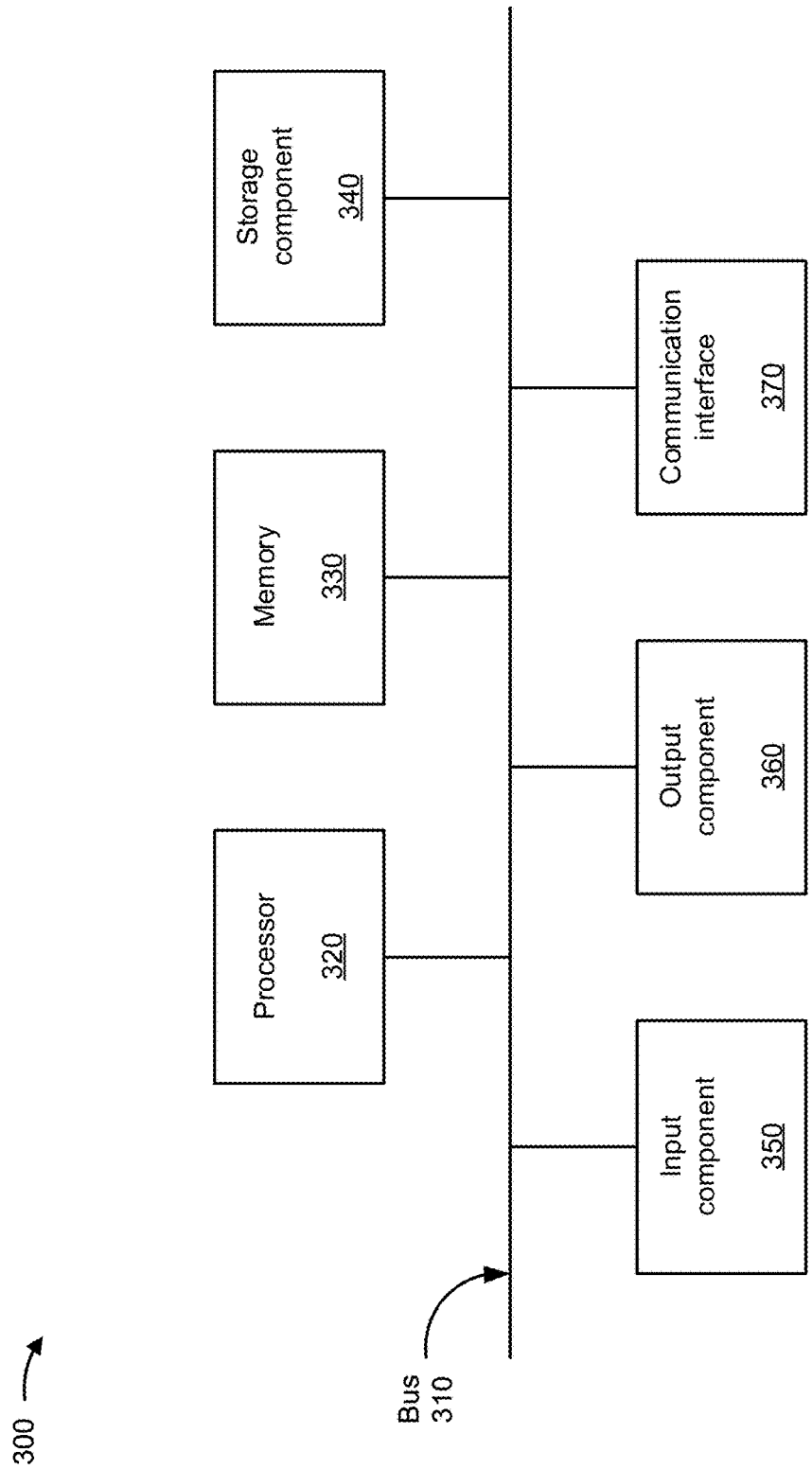
FIG. 3 is a diagram of example components of one or more devices of FIG. 2.

FIG. 3 is a diagram of example components of a device 300. Device 300 may correspond to client device 210, development platform 220, and/or computing resource 224. In some implementations, client device 210, development platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
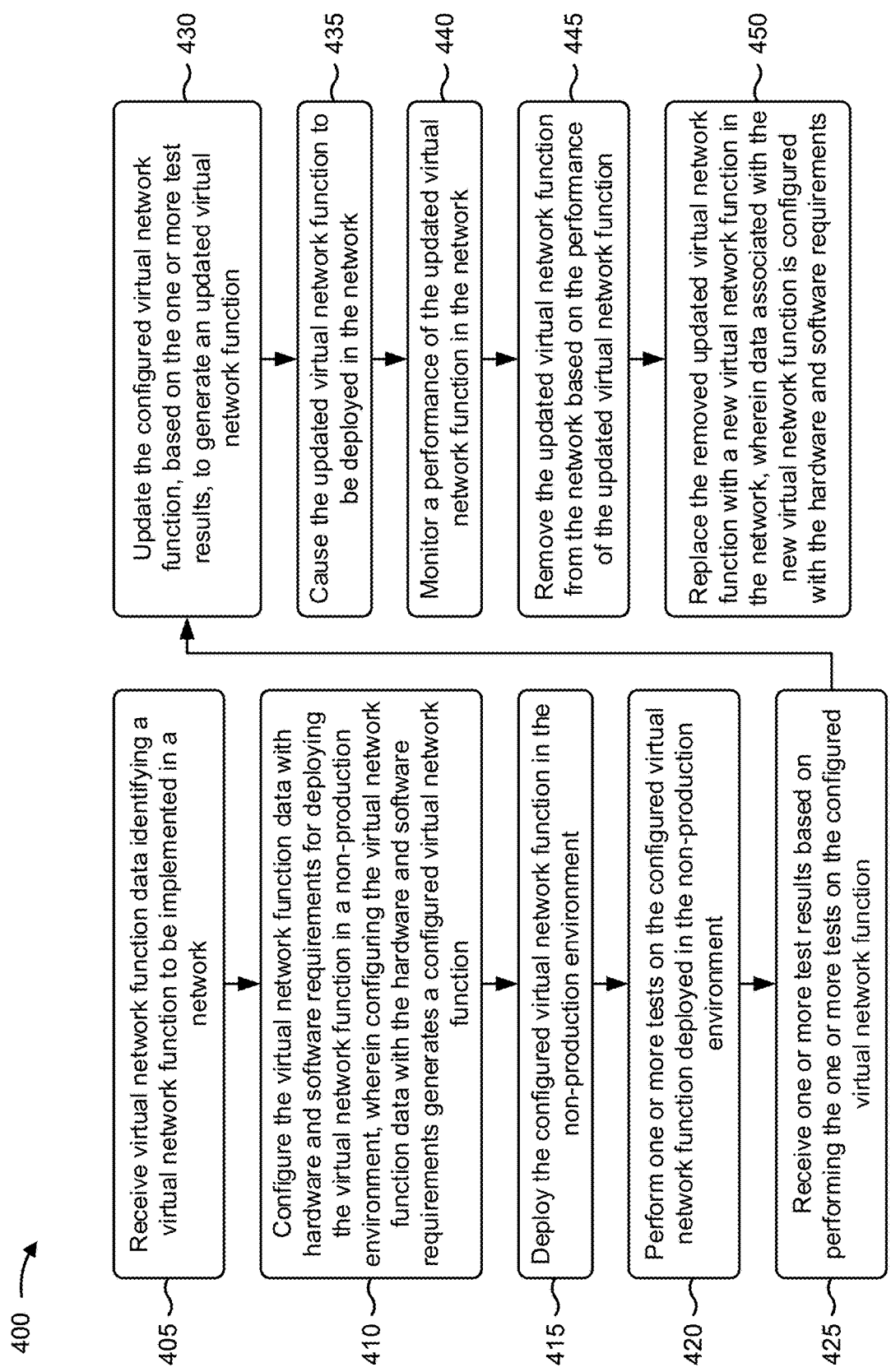

FIG. 4 is a flow chart of an example process 400 for deploying, testing, monitoring, scaling, and healing virtual network functions in a software-defined network. In some implementations, one or more process blocks of FIG. 4 may be performed by a development platform (e.g., development platform 220). In some implementations, one or more process blocks of FIG. 4 may be performed by another device or a group of devices separate from or including the development platform, such as a client device (e.g., client device 210).

As shown in FIG. 4, process 400 may include receiving virtual network function data identifying a virtual network function to be implemented in a network (block 405). For example, the development platform (e.g., using computing resource 224, processor 320, communication interface 370, and/or the like) may receive virtual network function data identifying a virtual network function to be implemented in a network, as described above in connection with FIGS. 1A-2.

As further shown in FIG. 4, process 400 may include configuring the virtual network function data with hardware and software requirements for deploying the virtual network function in a non-production environment, wherein configuring the virtual network function data with the hardware and software requirements generates a configured virtual network function (block 410). For example, the development platform (e.g., using computing resource 224, processor 320, storage component 340, and/or the like) may configure the virtual network function data with hardware and software requirements for deploying the virtual network function in a non-production environment, as described above in connection with FIGS. 1A-2. In some implementations, configuring the virtual network function data with the hardware and software requirements generates a configured virtual network function.

As further shown in FIG. 4, process 400 may include deploying the configured virtual network function in the non-production environment (block 415). For example, the development platform (e.g., using computing resource 224, processor 320, memory 330, communication interface 370, and/or the like) may deploy the configured virtual network function in the non-production environment, as described above in connection with FIGS. 1A-2.

As further shown in FIG. 4, process 400 may include performing one or more tests on the configured virtual network function deployed in the non-production environment (block 420). For example, the development platform (e.g., using computing resource 224, processor 320, storage component 340, and/or the like) may perform one or more tests on the configured virtual network function deployed in the non-production environment, as described above in connection with FIGS. 1A-2.

As further shown in FIG. 4, process 400 may include receiving one or more test results based on performing the one or more tests on the configured virtual network function (block 425). For example, the development platform (e.g., using computing resource 224, processor 320, memory 330, communication interface 370, and/or the like) may receive one or more test results based on performing the one or more tests on the configured virtual network function, as described above in connection with FIGS. 1A-2.

As further shown in FIG. 4, process 400 may include updating the configured virtual network function, based on the one or more test results, to generate an updated virtual network function (block 430). For example, the development platform (e.g., using computing resource 224, processor 320, storage component 340, and/or the like) may update the configured virtual network function, based on the one or more test results, to generate an updated virtual network function, as described above in connection with FIGS. 1A-2.

As further shown in FIG. 4, process 400 may include causing the updated virtual network function to be deployed in the network (block 435). For example, the development platform (e.g., using computing resource 224, processor 320, storage component 340, communication interface 370, and/or the like) may cause the updated virtual network function to be deployed in the network, as described above in connection with FIGS. 1A-2.

As further shown in FIG. 4, process 400 may include monitoring a performance of the updated virtual network function in the network (block 440). For example, the development platform (e.g., using computing resource 224, processor 320, memory 330, communication interface 370, and/or the like) may monitor a performance of the updated virtual network function in the network, as described above in connection with FIGS. 1A-2.

As further shown in FIG. 4, process 400 may include removing the updated virtual network function from the network based on the performance of the updated virtual network function (block 445). For example, the development platform (e.g., using computing resource 224, processor 320, storage component 340, communication interface 370, and/or the like) may remove the updated virtual network function from the network based on the performance of the updated virtual network function, as described above in connection with FIGS. 1A-2.

As further shown in FIG. 4, process 400 may include replacing the removed updated virtual network function with a new virtual network function in the network, wherein data associated with the new virtual network function is configured with the hardware and software requirements (block 450). For example, the development platform (e.g., using computing resource 224, processor 320, memory 330, communication interface 370, and/or the like) may replace the removed updated virtual network function with a new virtual network function in the network, wherein data associated with the new virtual network function is configured with the hardware and software requirements, as described above in connection with FIGS. 1A-2.

Process 400 may include additional implementations, such as any single implementation or any combination of implementations described below and/or described with regard to any other process described herein.

In some implementations, the development platform may cause one or more additional new virtual network functions to be deployed in the network to satisfy network demand associated with the network, where data associated with the one or more additional new virtual network functions are configured with the hardware and software requirements.

In some implementations, the development platform, when performing the one or more tests, may perform a conformance test on the configured virtual network function deployed in the non-production environment, may perform an interoperability test on the configured virtual network function deployed in the non-production environment, and may perform a performance test on the configured virtual network function deployed in the non-production environment. Additionally, the development platform, when receiving the one or more test results, may receive a conformance test result based on performing the conformance test on the configured virtual network function, may receive an interoperability test result based on performing the interoperability test on the configured virtual network function, and may receive a performance test result based on performing the performance test on the configured virtual network function.

In some implementations, the development platform may upgrade the configured virtual network function with a functionality or a feature and may redeploy the configured virtual network function after upgrading the configured virtual network function with the functionality or the feature. In some implementations, the one or more tests may include one or more of a test to determine compliance of the configured virtual network function with verification requirements, a test of an operation of the configured virtual network function, or a test of a capability of the configured virtual network function.

In some implementations, the development platform, when monitoring the performance of the updated virtual network function in the network, may monitor the performance of the updated virtual network function in the network based on specifications described in a descriptor associated with the updated virtual network function. In some implementations, the network may comprise a telecommunications software-defined network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
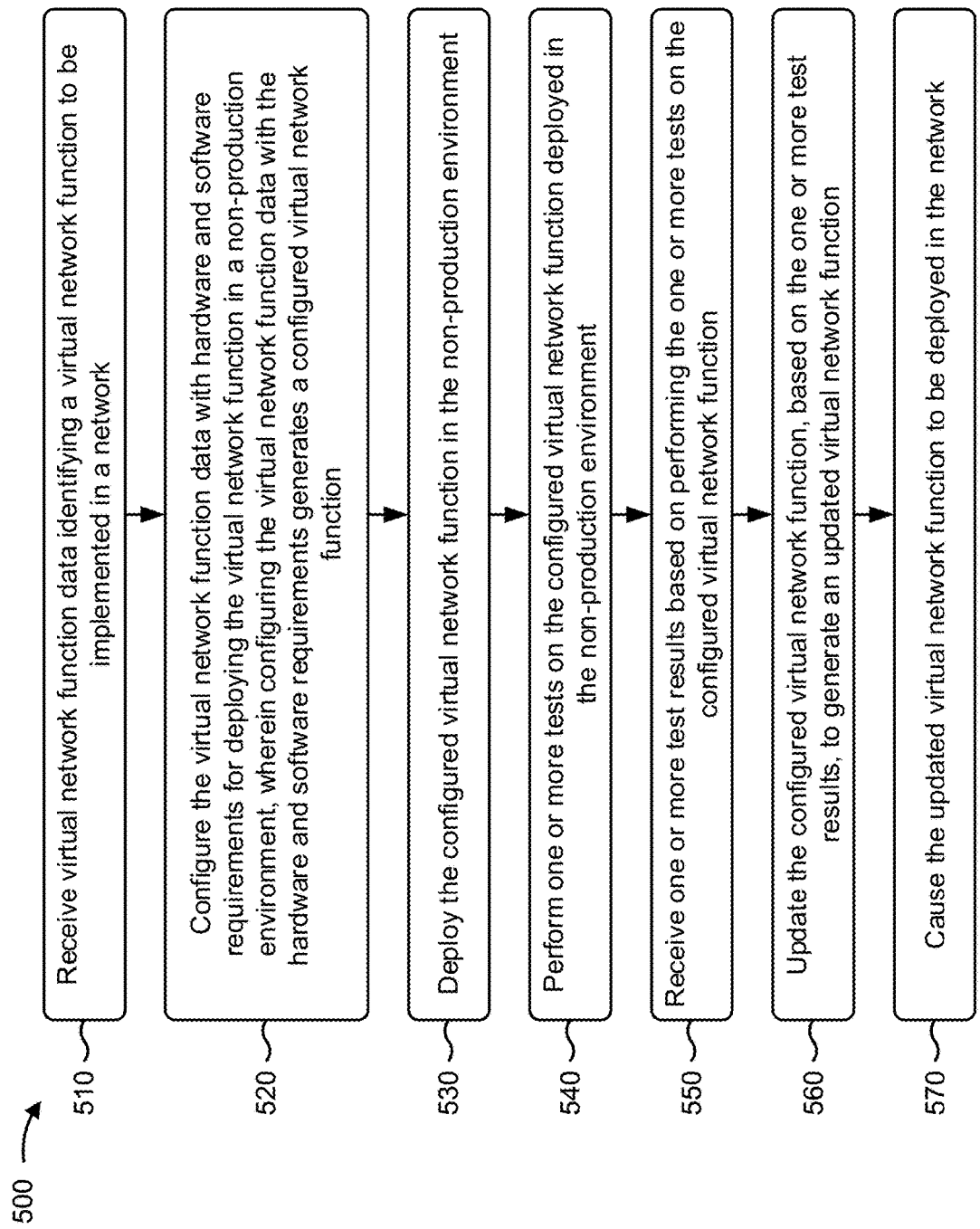

FIG. 5 is a flow chart of an example process 500 for deploying, testing, monitoring, scaling, and healing virtual network functions in a software-defined network. In some implementations, one or more process blocks of FIG. 5 may be performed by a development platform (e.g., development platform 220). In some implementations, one or more process blocks of FIG. 5 may be performed by another device or a group of devices separate from or including the development platform, such as a client device (e.g., client device 210).

As shown in FIG. 5, process 500 may include receiving virtual network function data identifying a virtual network function to be implemented in a network (block 510). For example, the development platform (e.g., using computing resource 224, processor 320, communication interface 370, and/or the like) may receive virtual network function data identifying a virtual network function to be implemented in a network, as described above in connection with FIGS. 1A-2.

As further shown in FIG. 5, process 500 may include configuring the virtual network function data with hardware and software requirements for deploying the virtual network function in a non-production environment, wherein configuring the virtual network function data with the hardware and software requirements generates a configured virtual network function (block 520). For example, the development platform (e.g., using computing resource 224, processor 320, storage component 340, and/or the like) may configure the virtual network function data with hardware and software requirements for deploying the virtual network function in a non-production environment, as described above in connection with FIGS. 1A-2. In some implementations, configuring the virtual network function data with the hardware and software requirements generates a configured virtual network function.

As further shown in FIG. 5, process 500 may include deploying the configured virtual network function in the non-production environment (block 530). For example, the development platform (e.g., using computing resource 224, processor 320, memory 330, communication interface 370, and/or the like) may deploy the configured virtual network function in the non-production environment, as described above in connection with FIGS. 1A-2.

As further shown in FIG. 5, process 500 may include performing one or more tests on the configured virtual network function deployed in the non-production environment (block 540). For example, the development platform (e.g., using computing resource 224, processor 320, memory 330, storage component 340, and/or the like) may perform one or more tests on the configured virtual network function deployed in the non-production environment, as described above in connection with FIGS. 1A-2.

As further shown in FIG. 5, process 500 may include receiving one or more test results based on performing the one or more tests on the configured virtual network function (block 550). For example, the development platform (e.g., using computing resource 224, processor 320, memory 330, communication interface 370, and/or the like) may receive one or more test results based on performing the one or more tests on the configured virtual network function, as described above in connection with FIGS. 1A-2.

As further shown in FIG. 5, process 500 may include updating the configured virtual network function, based on the one or more test results, to generate an updated virtual network function (block 560). For example, the development platform (e.g., using computing resource 224, processor 320, storage component 340, and/or the like) may update the configured virtual network function, based on the one or more test results, to generate an updated virtual network function, as described above in connection with FIGS. 1A-2.

As further shown in FIG. 5, process 500 may include causing the updated virtual network function to be deployed in the network (block 570). For example, the development platform (e.g., using computing resource 224, processor 320, memory 330, communication interface 370, and/or the like) may cause the updated virtual network function to be deployed in the network, as described above in connection with FIGS. 1A-2.

Process 500 may include additional implementations, such as any single implementation or any combination of implementations described below and/or described with regard to any other process described herein.

In some implementations, the development platform may monitor a performance of the updated virtual network function in the network, may remove the updated virtual network function from the network based on the performance of the updated virtual network function, and may replace the removed updated virtual network function with a new virtual network function in the network, where data associated with the new virtual network function is configured with the hardware and software requirements. In some implementations, the development platform may cause one or more additional updated virtual network functions to be deployed in the network to satisfy network demand associated with the network, where data associated with the one or more additional updated virtual network functions are configured with the hardware and software requirements.

In some implementations, the development platform, when performing the one or more tests, may perform a conformance test on the configured virtual network function deployed in the non-production environment, may perform an interoperability test on the configured virtual network function deployed in the non-production environment, and may perform a performance test on the configured virtual network function deployed in the non-production environment. In some implementations, the development platform, when receiving the one or more test results, may receive a conformance test result based on performing the conformance test on the configured virtual network function, may receive an interoperability test result based on performing the interoperability test on the configured virtual network function, and may receive a performance test result based on performing the performance test on the configured virtual network function.

In some implementations, the development platform may upgrade the configured virtual network function with a functionality or a feature and may redeploy the configured virtual network function after upgrading the configured virtual network function with the functionality or the feature. In some implementations, the development platform, when monitoring the performance of the updated virtual network function in the network, may monitor the performance of the updated virtual network function in the network based on specifications described in a descriptor associated with the updated virtual network function.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for deploying, testing, monitoring, scaling, and healing virtual network functions in a software-defined network. In some implementations, one or more process blocks of FIG. 6 may be performed by a development platform (e.g., development platform 220). In some implementations, one or more process blocks of FIG. 6 may be performed by another device or a group of devices separate from or including the development platform, such as a client device (e.g., client device 210).

As shown in FIG. 6, process 600 may include receiving virtual network function data identifying a virtual network function to be implemented in a network (block 610). For example, the development platform (e.g., using computing resource 224, processor 320, memory 330, communication interface 370, and/or the like) may receive virtual network function data identifying a virtual network function to be implemented in a network, as described above in connection with FIGS. 1A-2.

As further shown in FIG. 6, process 600 may include configuring the virtual network function data with hardware and software requirements for deploying the virtual network function in a non-production environment, wherein configuring the virtual network function data with the hardware and software requirements generates a configured virtual network function (block 620). For example, the development platform (e.g., using computing resource 224, processor 320, storage component 340, and/or the like) may configure the virtual network function data with hardware and software requirements for deploying the virtual network function in a non-production environment, as described above in connection with FIGS. 1A-2. In some implementations, configuring the virtual network function data with the hardware and software requirements generates a configured virtual network function.

As further shown in FIG. 6, process 600 may include deploying the configured virtual network function in the non-production environment (block 630). For example, the development platform (e.g., using computing resource 224, processor 320, memory 330, communication interface 370, and/or the like) may deploy the configured virtual network function in the non-production environment, as described above in connection with FIGS. 1A-2.

As further shown in FIG. 6, process 600 may include performing one or more tests on the configured virtual network function deployed in the non-production environment (block 640). For example, the development platform (e.g., using computing resource 224, processor 320, memory 330, and/or the like) may perform one or more tests on the configured virtual network function deployed in the non-production environment, based on the defect scores, as described above in connection with FIGS. 1A-2.

As further shown in FIG. 6, process 600 may include receiving one or more test results based on performing the one or more tests on the configured virtual network function (block 650). For example, the development platform (e.g., using computing resource 224, processor 320, storage component 340, communication interface 370, and/or the like) may receive one or more test results based on performing the one or more tests on the configured virtual network function, as described above in connection with FIGS. 1A-2.

As further shown in FIG. 6, process 600 may include updating the configured virtual network function, based on the one or more test results, to generate an updated virtual network function (block 660). For example, the development platform (e.g., using computing resource 224, processor 320, memory 330, and/or the like) may update the configured virtual network function, based on the one or more test results, to generate an updated virtual network function, as described above in connection with FIGS. 1A-2.

As further shown in FIG. 6, process 600 may include causing the updated virtual network function to be deployed in the network (block 670). For example, the development platform (e.g., using computing resource 224, processor 320, storage component 340, communication interface 370, and/or the like) may cause the updated virtual network function to be deployed in the network, as described above in connection with FIGS. 1A-2.

As further shown in FIG. 6, process 600 may include monitoring a performance of the updated virtual network function in the network (block 680). For example, the development platform (e.g., using computing resource 224, processor 320, memory 330, communication interface 370, and/or the like) may monitor a performance of the updated virtual network function in the network, as described above in connection with FIGS. 1A-2.

Process 600 may include additional implementations, such as any single implementation or any combination of implementations described below and/or described with regard to any other process described herein.

In some implementations, the development platform may remove the updated virtual network function from the network based on the performance of the updated virtual network function, and may replace the removed updated virtual network function with a new virtual network function in the network, where data associated with the new virtual network function is configured with the hardware and software requirements. In some implementations, the development platform may cause one or more additional new virtual network functions to be deployed in the network to satisfy network demand associated with the network, where data associated with the one or more additional new virtual network functions are configured with the hardware and software requirements.

In some implementations, the development platform, when performing the one or more tests, may perform a conformance test on the configured virtual network function deployed in the non-production environment, may perform an interoperability test on the configured virtual network function deployed in the non-production environment, and may perform a performance test on the configured virtual network function deployed in the non-production environment. Additionally, the development platform, when receiving the one or more test results, may receive a conformance test result based on performing the conformance test on the configured virtual network function, may receive an interoperability test result based on performing the interoperability test on the configured virtual network function, and may receive a performance test result based on performing the performance test on the configured virtual network function.

In some implementations, the development platform may upgrade the configured virtual network function with a functionality or a feature, and may redeploy the configured virtual network function after upgrading the configured virtual network function with the functionality or the feature. In some implementations, the network may comprise a telecommunications software-defined network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, virtual network function data identifying a virtual network function to be implemented in a network;
configuring, by the device, the virtual network function data with hardware and software requirements for deploying the virtual network function as a virtual router in a non-production environment,
wherein configuring the virtual network function data with the hardware and software requirements generates a configured virtual network function;
creating, by the device and based on configuring the virtual network function data, a descriptor for the configured virtual network function;
deploying, by the device and based on creating the descriptor, the configured virtual network function in the non-production environment;
performing, by the device, one or more tests on the configured virtual network function deployed in the non-production environment;
receiving, by the device, one or more test results based on performing the one or more tests on the configured virtual network function,
wherein the one or more test results indicate that at least one of a functionality or a feature are missing;
updating, by the device, the configured virtual network function, based on the one or more test results, to generate an updated virtual network function,
wherein updating the configured virtual network function comprises:
upgrading the configured virtual network function with the at least one of the functionality or the feature, based on the one or more test results indicating that the at least one of the functionality or the feature are missing, to generate the updated virtual network function;
deploying the updated virtual network function in the non-production environment for additional testing;
causing, by the device and based on a result of the additional testing, the updated virtual network function to be deployed in the network;
monitoring, by the device, a performance of the updated virtual network function in the network;
removing, by the device, the updated virtual network function from the network based on the performance of the updated virtual network function indicating that the updated virtual network function is performing abnormally; and
replacing, by the device, the removed updated virtual network function with a new virtual network function in the network,
wherein data associated with the new virtual network function is configured with the hardware and software requirements.

2. The method of claim 1, further comprising:
causing one or more additional new virtual network functions to be deployed in the network to satisfy network demand associated with the network,
wherein data associated with the one or more additional new virtual network functions are configured with the hardware and software requirements.

3. The method of claim 1,
wherein performing the one or more tests comprises:
   performing a conformance test on the configured virtual network function deployed in the non-production environment,
   performing an interoperability test on the configured virtual network function deployed in the non-production environment, and
   performing a performance test on the configured virtual network function deployed in the non-production environment; and
wherein receiving the one or more test results comprises:
   receiving a conformance test result based on performing the conformance test on the configured virtual network function,
   receiving an interoperability test result based on performing the interoperability test on the configured virtual network function, and
   receiving a performance test result based on performing the performance test on the configured virtual network function.

4. The method of claim 1, wherein the one or more tests include one or more of:
   a test to determine compliance of the configured virtual network function with verification requirements,
   a test of an operation of the configured virtual network function, or
   a test of a capability of the configured virtual network function.

5. The method of claim 1, wherein monitoring the performance of the updated virtual network function in the network comprises:
   monitoring the performance of the updated virtual network function in the network based on specifications described in a second descriptor associated with the updated virtual network function.

6. The method of claim 1, wherein the network comprises a telecommunications software-defined network.

7. A device, comprising:
one or more memories; and
one or more processors, communicatively coupled to the one or more memories, to:
   receive virtual network function data identifying a virtual network function to be implemented in a network;
   configure the virtual network function data with hardware and software requirements for deploying the virtual network function as a virtual router in a non-production environment,
      wherein configuring the virtual network function data with the hardware and software requirements generates a configured virtual network function;
   create, based on configuring the virtual network function data, a descriptor for the configured virtual network function;
   deploy, based on creating the descriptor, the configured virtual network function in the non-production environment;
   perform one or more tests on the configured virtual network function deployed in the non-production environment;
   receive one or more test results based on performing the one or more tests on the configured virtual network function,
      wherein the one or more test results indicate that at least one of a functionality or a feature are missing;
   update the configured virtual network function, based on the one or more test results indicating that the at least one of the functionality or the feature are missing, to generate an updated virtual network function, wherein the one or more processors, when updating the configured virtual network function, are to:
      upgrade the configured virtual network function with the at least one of the functionality or the feature to generate the updated virtual network function;
   deploy the updated virtual network function in the non-production environment for additional testing;
   cause, based on a result of the additional testing, the updated virtual network function to be deployed in the network;
   monitor a performance of the updated virtual network function in the network;
   remove the updated virtual network function from the network based on the performance of the updated virtual network function indicating that the updated virtual network function is performing abnormally; and
   replace the removed updated virtual network function with a new virtual network function in the network,
      wherein data associated with the new virtual network function is configured with the hardware and software requirements.

8. The device of claim 7, wherein the one or more processors are further to:
   cause one or more additional updated virtual network functions to be deployed in the network to satisfy network demand associated with the network,
      wherein data associated with the one or more additional updated virtual network functions are configured with the hardware and software requirements.

9. The device of claim 7, wherein the one or more processors, when performing the one or more tests, are to:
   perform a conformance test on the configured virtual network function deployed in the non-production environment;
   perform an interoperability test on the configured virtual network function deployed in the non-production environment; and
   perform a performance test on the configured virtual network function deployed in the non-production environment.

10. The device of claim 9, wherein the one or more processors, when receiving the one or more test results, are to:
   receive a conformance test result based on performing the conformance test on the configured virtual network function;
   receive an interoperability test result based on performing the interoperability test on the configured virtual network function; and
   receive a performance test result based on performing the performance test on the configured virtual network function.

11. The device of claim 7, wherein the one or more processors, when monitoring the performance of the updated virtual network function in the network, are to:
   monitor the performance of the updated virtual network function in the network based on specifications described in a second descriptor associated with the updated virtual network function.

12. A non-transitory computer-readable medium storing instructions, the instructions comprising:

one or more instructions that, when executed by one or more processors of a device, cause the one or more processors to:
  receive virtual network function data identifying a virtual network function to be implemented in a network;
  configure the virtual network function data with hardware and software requirements for deploying the virtual network function as a virtual router in a non-production environment,
    wherein configuring the virtual network function data with the hardware and software requirements generates a configured virtual network function;
  create, based on configuring the virtual network function data, a descriptor for the configured virtual network function;
  deploy, based on creating the descriptor, the configured virtual network function in the non-production environment;
  perform one or more tests on the configured virtual network function deployed in the non-production environment;
  receive one or more test results based on performing the one or more tests on the configured virtual network function,
    wherein the one or more test results indicate that at least one of a functionality or a feature are missing;
  update the configured virtual network function, based on the one or more test results indicating that the at least one of the functionality or the feature are missing, to generate an updated virtual network function, wherein the one or more instructions, that cause the one or more processors to update the configured virtual network function, cause the one or more processors to:
    upgrade the configured virtual network function with the functionality or the feature to generate the updated virtual network function;
  deploy the updated virtual network function in the non-production environment for additional testing;
  cause, based on a result of the additional testing, the updated virtual network function to be deployed in the network;
  monitor a performance of the updated virtual network function in the network;
  remove the updated virtual network function from the network based on the performance of the updated virtual network function indicating that the updated virtual network function is performing abnormally; and
  replace the removed updated virtual network function with a new virtual network function in the network,
    wherein data associated with the new virtual network function is configured with the hardware and software requirements.

13. The non-transitory computer-readable medium of claim 12, wherein the instructions further comprise:
  one or more instructions that, when executed by the one or more processors, cause the one or more processors to:
    cause one or more additional new virtual network functions to be deployed in the network to satisfy network demand associated with the network,
      wherein data associated with the one or more additional new virtual network functions are configured with the hardware and software requirements.

14. The non-transitory computer-readable medium of claim 12, wherein the one or more instructions, that cause the one or more processors to perform the one or more tests, cause the one or more processors to:
  perform a conformance test on the configured virtual network function deployed in the non-production environment,
  perform an interoperability test on the configured virtual network function deployed in the non-production environment, and
  perform a performance test on the configured virtual network function deployed in the non-production environment; and
  wherein the one or more instructions, that cause the one or more processors to receive the one or more test results, cause the one or more processors to:
  receive a conformance test result based on performing the conformance test on the configured virtual network function,
  receive an interoperability test result based on performing the interoperability test on the configured virtual network function, and
  receive a performance test result based on performing the performance test on the configured virtual network function.

15. The non-transitory computer-readable medium of claim 12, wherein the network comprises a telecommunications software-defined network.

16. The method of claim 1, wherein deploying the configured virtual network function comprises:
  causing, based on creating the descriptor, the configured virtual network function to be instantiated in the non-production environment in such a manner that the configured virtual network function is configured to perform functions that the configured virtual network function would perform in the production environment.

17. The method of claim 2, wherein causing the one or more additional new virtual network functions to be deployed in the network to satisfy network demand associated with the network is based on usage of the updated virtual network function or a network demand associated with the production environment.

18. The method of claim 3, wherein the performance test is based on a threshold performance level.

19. The device of claim 7, wherein the one or more processors, when deploying the configured virtual network function, are to:
  cause, based on creating the descriptor, the configured virtual network function to be instantiated in the non-production environment in such a manner that the configured virtual network function is configured to perform functions that the configured virtual network function would perform in the production environment.

20. The non-transitory computer-readable medium of claim 12, wherein the one or more instructions, that cause the one or more processors to deploy the configured virtual network function, cause the one or more processors to:
  cause, based on creating the descriptor, the configured virtual network function to be instantiated in the non-production environment in such a manner that the configured virtual network function is configured to perform functions that the configured virtual network function would perform in the production environment.

* * * * *